Nov. 14, 1961  C. A. COSTELLO  3,008,786
DYNAMOELECTRIC MACHINE CONSTRUCTION
Filed July 24, 1958
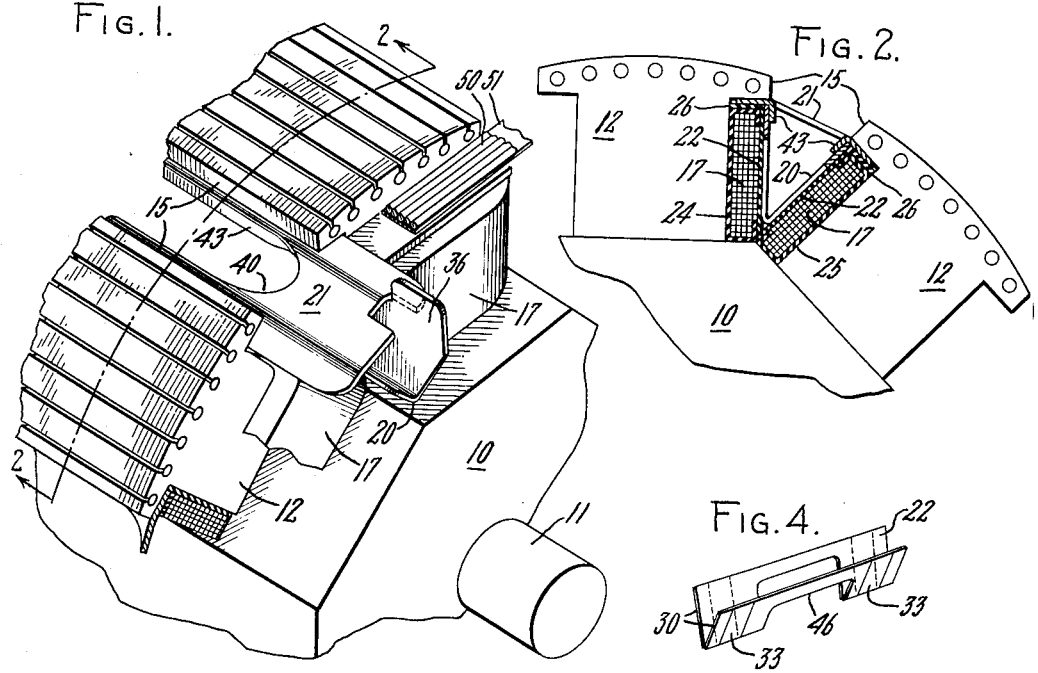
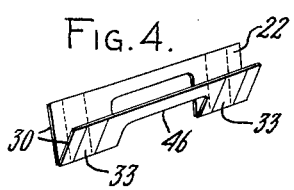
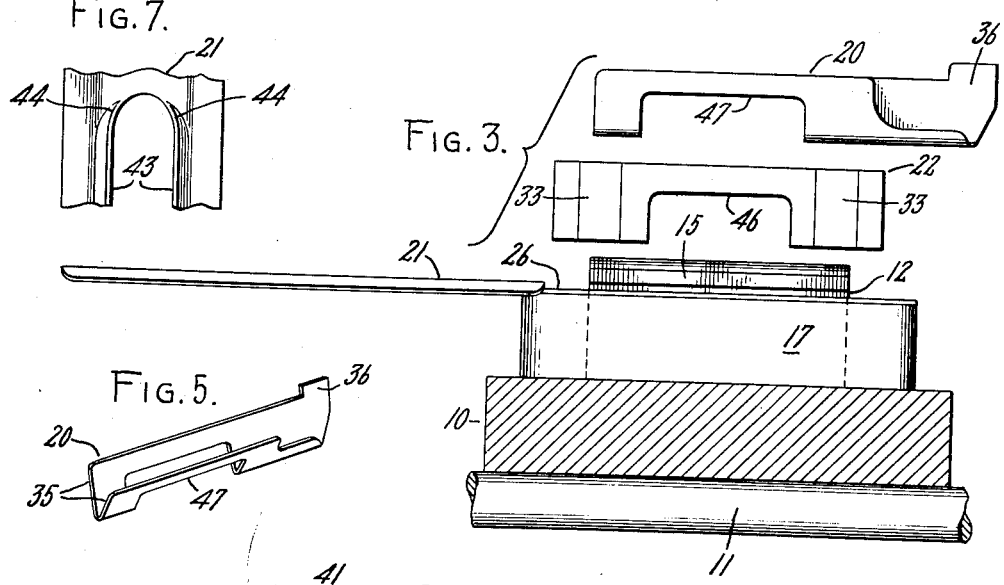
Inventor
Charles A. Costello
by Vernon F. Kalb
His Attorney

United States Patent Office 3,008,786
Patented Nov. 14, 1961

3,008,786
DYNAMOELECTRIC MACHINE CONSTRUCTION
Charles A. Costello, Erie, Pa., assignor to General Electric Company, a corporation of New York
Filed July 24, 1958, Ser. No. 750,671
7 Claims. (Cl. 310—214)

My invention relates to dynamoelectric machine construction and, more particularly, to the construction for maintaining and cooling salient pole windings of a salient pole rotor in a synchronous machine.

The construction of a salient pole rotor is complicated by the fact that the overall efficiency of the machine in terms of pounds per kilowatt is improved by providing light weight and efficient winding support structures which allow the heat of the rotor windings to be dissipated quickly. In the past, many different arrangements have been resorted to in an attempt to maintain the rotor pole windings physically in place while allowing cooling medium such as air to engage a major portion of the winding surface with a minimum of unnecessary turbulence.

It is essential in such a machine, because of the centrifugal forces during high speed operation, to secure all of the turns of each salient pole winding so that they may not be displaced with a resultant imbalance which would destroy bearings of the machine. In order to accomplish this in past constructions, it has been a practice of motor manufacturers to drive, from the end of the rotor, delta shaped wedges between the windings to maintain a compression of the winding sides. Because of the fact that these delta shaped wedges should be loose enough to be driven into the space between the windings without causing damage to the insulation, it sometimes occurs that one will move axially to cause severe balancing problems. On the other hand when the delta shaped wedge is a particularly tight fit, the driving of the wedges into the space will sometimes rupture insulation on the surfaces of the windings. This is particularly true where light weight, thin insulation is used. Obviously, light weight, thin insulation provides a cooling advantage because insulation of electrical components is a thermal barrier to the transfer of heat from the machine and the thicker the insulation must be for mechanical protection, the lower will be its total thermal conductivity. Moreover, where the salient pole winding is provided with a minimum of electrical insulation, the end turns of the winding will require additional mechanical support such as banding with a stainless steel wire.

Accordingly, a primary object of my invention is to eliminate these disadvantages by the use of a simple and inexpensive rotor winding support construction which will provide a maximum conductivity of heat from the windings.

Briefly stated, I carry out my invention by positioning a radially insertable V-shaped wedge between adjacent windings of a salient pole rotor. The wedges are secured in their proper location by a top stick which is axially insertable to lie radially between the wedge and the pole tips to secure the wedge in position. Also, I provide a large aperture in the center of the top stick which, combined with the salient poles and wedge construction will result in air to flow inward from the ends of the machine and to be discharged through the aperture for increased cooling of the windings.

The subject matter which I regard as my invention is particularly pointed out and distinctly claimed in the concluding portion of this specification. My invention, however, as to its organization and method of operation together with further objects and advantages thereof will best be understood by reference to the following description taken in connection with the accompanying drawing, in which:

FIG. 1 is a perspective view of a portion of a salient pole rotor embodying my invention;

FIG. 2 is a partial sectional end view taken along line 2—2 of FIG. 1 showing one complete slot between adjacent pole members;

FIG. 3 is an exploded view, partially broken away, of a wedge system made according to my invention;

FIG. 4 is a perspective detail view of the insulation member used in my invention;

FIG. 5 is a perspective detail view of the wedge;

FIG. 6 is a perspective detail view of the top sticks; and

FIG. 7 is a bottom detail plan view of a portion of the top stick shown in FIG. 6.

Referring now to the drawing wherein like reference numerals designate corresponding parts, I have shown in FIG. 1 a portion of a rotor 10 rotatably supported on a shaft 11 and operatively supporting a plurality of salient poles 12. I prefer to have the pole pieces 12 formed of high permeability laminations as are well known in the dynamoelectric machine art. The pole pieces are provided with oppositely disposed pole tips 15 (FIGS. 1 and 2) which extend, tangentially, over the sides of the excitation coils or windings 17 between the poles.

In order to firmly position the excitation windings 17 with respect to each other and the pole pieces 12, I have provided a V-shaped wedge 20 therebetween which is maintained radially by a top stick 21. Between the wedge 20 and the coils 17, I have positioned a dielectric insulating material 22 which will conform to the V-shaped space provided between the wedge 20 and the coils 17.

As shown in FIG. 2, it is a usual practice to provide slot liner insulation or slot tubes 24 and 25 to insure electric insulation between the winding 17 and the pole member 12. Also, I have found it desirable when using a top stick 21 to provide insulating material 26 between the top of the winding 17 and the top stick 21. In the construction shown, the slot tubes 24 and 25 are formed to enclose three surfaces of the windings 17.

The assembly procedure usable with my invention may be envisioned more clearly by reference to FIG. 3 wherein I have shown a pole member 12 having the pole tip 15 extending tangentially over the winding 17. The insulating member 22 may be positioned when the winding 17 is positioned on the pole 12 by moving the member 22 from the position shown radially inward to engage the sides of adjacent windings 17. Next, the wedge 20 is moved radially inward to be positioned over the insulation member 22 and to compress the insulation 22 against the sides of the adjacent windings 17. In order to maintain the insulating member 22 and the wedge 20 in position the top stick 21 is then inserted axially between the pole tips 15 and the wedge 20. As discussed below, the top stick 21 is provided with detents 43 which will produce a wedging or spreading action on bifurcations 35 of the wedge 20 during assembly and will maintain a predetermined spacing between the bifurcations 35 of the wedge 20 and to engage the top of the wedge and the underside of the pole tips 15 to prevent radial displacement of either the wedge 20 or the insulating member 22 during use.

Referring now to FIG. 4 where I have shown a detail perspective view of the insulating member 22, it should be noted that the V-shaped insulating member is provided with a resilient hinge arrangement which will insure a sufficient distance between the bifurcations 30 to allow inserting of the wedge 20 with the assurance that a portion of the insulating member 22 will be on each side of the bight portion of the wedge 20 and will thus insulate the wedge 20 from each adjacent coil side of the windings 17.

If the insulating member 22 is fabricated from a pliable and resilient substance, this alone will assure separation of the bifurcations 30 sufficient to facilitate assembly of the insulation system. However, in many cases where the insulation material includes a brittle material such as certain impregnated glass clothes, I prefer to provide a separate hinge member 33 at each end of the insulation member 22. This hinge member may consist of a piece of flexible tape which will hold the bifurcations 30 apart during the assembly process.

Referring now to FIG. 5, I have shown a detail perspective view of the wedge member 20. Usually this wedge member 20 must be made from a relatively tough material such as stainless steel and must provide sufficient elasticity to maintain a desired distance between its bifurcations 35 and the pole tips 15 to allow the insertion of the top stick 21 from the end. In certain high temperature applications, the wedge 20 is provided with a fan blade 36 as described in detail in the application serial number 679,481 filed by Mr. A. J. Wesolowski on August 21, 1957, now Patent 2,899,573, and assigned to the assignee of the present application.

In FIG. 6, I have shown a detail perspective view of a top stick suitable for use in my invention. The top stick 21 defines a relatively large central aperture 40 which will promote the flow of air outwardly from between the sides of the windings 17. Also, the top stick 21 defines at its ends recesses 41 which will engage and help to support the fan blades 36 as best shown in FIG. 1. At the same time the aperture 40 is formed, it is feasible to provide downwardly projecting detents or flanges 43 which will engage the inner surface of the bifurcations 35 (see FIG. 2) to maintain a proper distance between the bifurcations 35 thus providing sufficient compression between the wedge 20 and the sides of the windings 17 to inhibit any movement of the coil sides and thus prevent either static or dynamic imbalance of a completed and balanced rotor.

In order to establish proper spacing of the bifurcations 35, the flanges 43 may be provided with tapered lead contours 44 as shown more clearly in FIG. 7. These tapered lead contours 44 will insure the positioning of the bifurcations 35 by the top stick 21 axially between the flanges 43 and the windings 17.

It should be noted that both the insulation member 22 and the wedge 20 define mating apertures 46 and 47 respectively which allow cooling air to engage directly the sides of the windings 17. Moreover, in high temperature rotors, the ends of the top sticks 21 provide additional functions in establishing a metallic surface on which metallic balance weights may be secured between windings 17 by spot welding or brazing to the inner radial surfaces of the end portions 45; and, further, the end portions 45 provide outer radial surfaces which will support a plurality of banding wires 50 (FIG. 1) therearound in a cylindrical configuration.

It has been found that between end turn support of the banding wires 50 is particularly desirable when it is necessary to increase the speed of the salient pole rotor substantially. The positioning of the annular banding wires without top stick support (FIG. 1) as provided by my invention will create a combination arcuate and chord configuration which results in stress concentrations at the point where the band becomes unsupported by the end turns. This stress concentration is likely to damage the banding wire itself and the insulation between the banding wire and the end turn of the windings 17. Moreover, I have found for high speed operation in which the banding wire is substantially stressed to its limit, it is preferable to provide a stress distributing metallic strip 51 between the banding wire 50 and the end turns of the windings 17 to prevent the individual turns of wire 50 from grooving or damaging the end turns and their insulation.

If the top stick 21 is a type with a relatively flat outer radial surface of the end poles 45, the banding wire 50 may be held in location by brazing it to the top surface of the top stick. However, I have found that an additional function may be provided by the top stick by an upwardly projecting detent 54 which will locate banding wire 50 and the stress distributing strip 51.

While I have illustrated and described particular embodiments of my invention, other modifications will occur to those skilled in the art. For instance, in some applications, the wedge 20 will not require the addition of the fan blade 36. Also, in certain structures, such as rotors having axially short pole members 12, the wedge may be quite a short unapertured V-shaped member. On the other hand, in long rotors, the wedge may be formed of a plurality of V-shaped members with apertures therebetween. I intend, therefore, to cover in the appended claims all such modifications as fall within the true spirit and scope of my invention.

What I claim as new and desire to secure by Letters Patent of the United States is:

1. In a salient pole rotor for a dynamoelectric machine wherein each of a plurality of pole members includes a winding about the pole member and oppositely disposed pole tips extending over the sides of the windings between the poles, a winding retaining construction comprising, a V-shaped wedge located between two adjacent windings with the bifurcations thereof positioned to force said windings against their respective pole members, a top stick extending between adjacent poles having surface portions engaging the underside of adjacently extending pole tips and overlying the edges of said bifurcations, the top stick defining a central aperture for affording flow of cooling air therethrough, and detents on the top stick extending radially inwardly to engage the bifurcations and maintain the spacing of the V-shaped wedge.

2. In a salient pole rotor for a dynamoelectric machine wherein each of a plurality of pole members includes a winding about the pole member and oppositely disposed pole tips extending over the sides of the windings between the poles, a winding retaining construction comprising, a V-shaped wedge located between two adjacent windings with the bifurcations thereof positioned to force said windings against their respective pole members, a top stick extending between adjacent poles having surface portions engaging the underside of adjacently extending pole tips and overlying the edges of said bifurcations, and detents on the top stick extending radially inwardly to engage the bifurcations and maintain the spacing of the V-shaped wedge.

3. In a salient pole rotor for a dynamoelectric machine wherein each of a plurality of pole members includes a winding about the pole member and oppositely disposed pole tips extending over the sides of the windings between the poles, a winding retaining construction comprising, a V-shaped wedge located between two adjacent windings with the bifurcations thereof positioned to force said windings against their respective pole members, a V-shaped piece of insulating material positioned between the wedge and the adjacent windings to prevent electric contact therebetween, a top stick having side portions extending between adjacent poles having surface portions engaging the underside of adjacents extending pole tips and overlying the edges of said bifurcations for preventing radial displacement of the wedge, the top stick defining a central aperture for affording flow of cooling air therethrough, and detents on the top stick extending radially inwardly to engage the bifurcations and maintain the spacing of the V-shaped wedge and the V-shaped insulating material.

4. In a salient pole rotor for a dynamoelectric machine wherein each of a plurality of pole members includes a winding about the pole member and oppositely disposed pole tips extending over the sides of the windings between the poles, a winding retaining construction comprising, a V-shaped wedge located between two adjacent windings with the bifurcations thereof positioned to force said windings against their respective pole members, a V-shaped piece of insulated material positioned between the wedge and the adjacent windings to prevent electric contact therebetween, the wedge and the insulating material each defining an aperture which will allow cooling air to contact the windings, a top stick insertable axially between the ends of the bifurcations and the tips of the pole members for preventing radial displacement of the wedge, the top stick defining a central aperture for flow of cooling air therethrough, and detents on the top stick extending radially inwardly to engage the bifurcations and maintain the spacing of the V-shaped wedge and the V-shaped insulating material.

5. In a salient pole rotor for a dynamoelectric machine wherein each of a plurality of pole members includes a winding about the pole member and oppositely disposed pole tips extending over the sides of the windings between the poles, a winding retaining construction comprising, a V-shaped wedge located between two adjacent windings with the bifurcations thereof positioned to force said windings against their respective pole members a V-shaped piece of insulating material positioned between the wedge and the adjacent windings to prevent electric contact therebetween, the wedge and the insulating material each defining an aperture which will allow cooling air to contact the windings, the insulating material being resilient at its bight portion to cause the separation of its bifurcations for facilitating the insertion of the wedge therein, a top stick insertable axially between the ends of the bifurcations and the tips of the pole members for preventing radial displacement of the wedge, the top stick defining a central aperture for flow of cooling air therethrough, and detents on the top stick extending radially inwardly to engage the bifurcations and to maintain the spacing of the V-shaped wedge and the V-shaped insulating material.

6. In a salient pole rotor for a dynamoelectric machine wherein each of a plurality of pole members includes a winding about the pole member and oppositely disposed pole tips extending over the sides of the windings between the poles, a winding retaining construction comprising, a V-shaped wedge located between two adjacent windings with the bifurcations thereof positioned to force said windings against their respective pole members, a top stick having side portions extending between adjacent poles and having surface portions engaging the underside of adjacently extending pole tips and overlying the edges of said bifurcations for preventing radial displacement of the wedge, the top stick defining a central aperture for flow of cooling air therethrough, and detents on the top stick extending radially inwardly to engage the bifurcations and maintain the spacing of the V-shaped wedge, the detents having inwardly tapered leading contours to assure the positioning of the bifurcations between the detents and the adjacent windings.

7. In a salient pole rotor for a dynamoelectric machine wherein each of a plurality of pole members includes a winding about the pole member and oppositely disposed pole tips extending over the sides of the windings between the poles, a winding retaining construction comprising, a V-shaped wedge located between two adjacent windings with the bifurcations thereof positioned to force said windings against their respective pole members, a top stick having side portions extending between adjacent poles and having surface portions engaging the underside of adjacently extending pole tips and overlying the edges of said bifurcations for preventing radial displacement of the wedge, the top stick defining a central aperture for flow of cooling air therethrough, detents on the top stick extending radially inwardly to engage the bifurcations and maintain the spacing of the V-shaped wedge, and detents having inwardly tapered leading contours to insure the positioning of the bifurcations between the detents and the adjacent windings, the ends of the top stick extending axially a sufficient distance beyond the pole members to provide a rigid support for banding wire, and detents extending radially outwardly adjacent to the ends of the top stick to locate the banding wire.

References Cited in the file of this patent

UNITED STATES PATENTS

| | | |
|---|---|---|
| 894,533 | Reist | July 28, 1908 |
| 2,899,573 | Wesolowski | Aug. 11, 1959 |

FOREIGN PATENTS

| | | |
|---|---|---|
| 854,796 | France | Jan. 24, 1940 |
| 931,299 | Germany | Aug. 4, 1955 |

UNITED STATES PATENT OFFICE
CERTIFICATION OF CORRECTION

Patent No. 3,008,786                              November 14, 1961

Charles A. Costello

It is hereby certified that error appears in the above numbered patent requiring correction and that the said Letters Patent should read as corrected below.

Column 4, line 63, for "adjacents" read -- adjacently --; column 5, line 23, after "members" insert a comma.

Signed and sealed this 10th day of April 1962.

(SEAL)
Attest:

ERNEST W. SWIDER                                  DAVID L. LADD
Attesting Officer                                     Commissioner of Patents